3,347,705
PRODUCTION OF JUICE FROM SUGAR-CONTAINING PLANT MATERIAL
Erland Viktor Jung, Landskrona, Sweden, assignor to Knapsack Aktiengesellschaft, Knapsack, near Cologne, Germany, a corporation of Germany
No Drawing. Filed Oct. 10, 1966, Ser. No. 585,329
Claims priority, application Germany, Oct. 11, 1963, J 24,545; Oct. 28, 1965, J 29,268
6 Claims. (Cl. 127—44)

ABSTRACT OF THE DISCLOSURE

Process for making juice from sugar-containing plant material, such as sugar beet or sugar cane, sliced into cossettes, in extractor by means of extracting liquor formed e.g. of make-up and squeeze water in which the cossettes and/or the make-up and/or squeeze water are admixed with polyphosphoric acid or polyphosphoric acid in combination with a dicarboxylic acid, and with colloidal silicic acid as an additional addend. Preferably, the colloidal silicic acid is added to the polyphosphoric or polyphosphoric acid in combination with a dicarboxylic acid and the acid mixture is added then e.g. to the squeeze water. The proportion of polyphosphoric acid added to the cossettes or extracting liquor preferably varies between 0.02 and 0.10% by weight, referred to the cossettes. The polyphosphoric acid and colloidal silicic acid should conveniently be used in approximately identical proportions. The proportion of silicic acid to be added conveniently varies between 0.0001 and 0.3% by weight, preferably between 0.01 and 0.1% by weight, referred to the quantity of cossettes.

---

The present application is a continuation-in-part of application Ser. No. 402,918 filed Oct. 6, 1964 by Erland Viktor Jung now U.S. Patent No. 3,313,653.

That application describes a process for making juice from sugar-containing plant material, such as sugar beet or sugar cane, sliced into cossettes, in an extractor by means of an extracting liquor formed e.g. of make-up and squeeze water, where polyphosphoric acid and/or dicarboxylic acid are added to the cossettes and/or to the make-up and/or squeeze water with the object of conserving the initial stiffness of the cossettes even when extracted and squeezed at high speed, and with the object of obtaining juice having so low a content of nonsugar substances, such as pectins, proteins and soluble nitrogen compounds, that it can be subjected to economic treatment in an adsorption or ion exchange column without being purified previously.

More particularly, an ordinary acid is added to the make-up water to adjust a convenient pH-value, and the polyphosphoric acid and/or dicarboxylic acid is added to the squeeze water. Alternatively, a mixture formed of an ordinary acid and polyphosphoric acid can be added to the make-up water buffered with a slight proportion of squeeze water. Hydrogen ions set free during treatment of the cossettes with the polyphosphoric and/or dicarboxylic acid can be neutralized by means of a base, such as a hydroxide of a bi- or polyvalent metal, which is added with the object of improving the stabilization of the pectins present in the cossettes.

Polyphosphoric acid containing at least 72.4% by weight $P_2O_5$ is preferably used, and itaconic acid is preferably used as the dicarboxylic acid. More particularly, the cossettes and/or the extracting liquor are admixed with a proportion of polyphosphoric acid varying between 0.001 and 0.1% by weight, with a proportion of itaconic acid varying between 0.005 and 0.04% by weight, and with a proportion of calcium hydroxide varying between 0.0005 and 0.04% by weight, the percentages of the addends being referred to the quantity of cossettes obtained. Crude juice coming from the extractor, which is not subjected to purifying treatment, is conveyed to an adsorption and ion-exchange column to be freed therein from organic coloring matter, salts forming incrustations and molasses, and acids.

The apparatus used for carrying out the above process is formed of at least one cutting means for slicing the beets or similar material into cossettes; a conveyor conveying the cossettes from the cutting means to an extractor which has associated feed lines supplying extracting liquid; one or more beet pulp squeezing means connected to the extractor by a beet pulp conveyor; and preferably at least one adsorption column, a cation exchanger and an anion exchanger receiving the sugar juice produced; and feed lines supplying polyphosphoric acid and/or dicarboxylic acid to the cossettes and/or the extracting liquor.

It has now unexpectedly been found that the above process can be improved by adding colloidal silicic acid as a further addend to the material to be extracted. In accordance with the present invention, the cossettes and/or the make-up and/or squeeze water are admixed with polyphosphoric acid or polyphosphoric acid in combination with a dicarboxylic acid, and with colloidal silicic acid as an additional addend. This results in the initial stiffness of the cossettes being conserved or even improved. In other words, the cossettes can be extracted and liquor can be removed therefrom at a high speed, and a pulp with a high content of dry substance is obtained.

Preferably, the colloidal silicic acid is added to the polyphosphoric or polyphosphoric acid in combination with a dicarboxylic acid and the acid mixture is added then e.g. to the squeeze water. The proportion of polyphosphoric acid added to the cossettes or extracting liquor preferably varies between 0.02 and 0.10% by weight, referred to the cossettes.

The polyphosphoric acid and colloidal silicic acid should conveniently be used in approximately identical proportions. The proportion of silicic acid to be added conveniently varies between 0.0001 to 0.3% by weight, preferably between 0.01 and 0.1% by weight, referred to the quantity of cossettes.

The following comparative experiment illustrates the advantage offered by the process of the present invention.

In a pilot plant extractor designed for a capacity of 2000 tons cossettes per day at a discharge rate of 110% by weight, the squeeze water was admixed once with 0.028% by weight polyphosphoric acid, and once with a further 0.028% by weight colloidal silicic acid as an additional added, the percentages being referred to the quantity of cossettes. The squeezed mass obtained after the pulp squeezer had the following content of dry substance.

Addition of polyphosphoric acid alone:
  27–35% by weight dry substance
Addition of polyphosphoric acid and silicic acid:
  40–56% by weight dry substance.

The addition of polyphosphoric acid combined with silicic acid produced a squeezed mass with a considerably increased content of dry substance. This is the result of the very high stiffness of the pulp and the considerably higher squeezing pressure which could be applied in processing the pulp. A technical advantage associated therewith resides in the fact that considerably less calorific energy is necessary for the successive drying operation.

The addition of polyphosphoric acid combined with silicic acid has been found to entail the same advantages as the addition of polyphosphoric acid alone with respect to the high purity of the juice and the production of cossettes and juice free from bacteria.

I claim:

1. In the process for the production of juice from starting material including a sugar containing plant material comminuted into chips and an extracting liquid formed of at least one member selected from the group consisting of polyphosphoric acid and polyphosphoric acid in combination with a dicarboxylic acid, the improvement which comprises adding colloidal silicic acid to at least one of the said starting materials.

2. The process of claim 1, within the polyphosphoric and colloidal silicic acids are used in approximately identical proportions.

3. The process of claim 1, wherein the colloidal silicic acid is added to at least one member selected from the group consisting of polyphosphoric acid and polyphosphoric acid in combination with a dicarboxylic acid before use thereof.

4. The process of claim 3, wherein the cossettes and extracting liquid, respectively, are admixed with a proportion of polyphosphoric acid varying between 0.02 and 0.10% by weight, referred to the quantity of cossetts.

5. The process of claim 1, wherein the colloidal silicic acid is added in a proportion varying between 0.0001 and 0.3% by weight, referred to the quantity of cossettes.

6. The process of claim 5, wherein the colloidal silicic acid is added in a proportion varying between 0.01 and 0.1% by weight.

References Cited

UNITED STATES PATENTS

| | | | |
|---|---|---|---|
| 950,035 | 2/1910 | Weinrich | 127—44 |
| 2,602,761 | 7/1952 | Hildebrandt | 127—7 |

OTHER REFERENCES

McGinnis, R. A.: Beet-Sugar Technology, 1951, Reinhold Publishing Corp., New York, page 186 relied on.

MORRIS O. WOLK, *Primary Examiner.*

MICHAEL E. ROGERS, *Examiner.*